United States Patent Office 3,444,131
Patented May 13, 1969

3,444,131
HYDROXYMETHYL DIPHENYL OXIDE-MODIFIED POLYESTER RESINS
Earl H. Rosenbrock, Auburn, and James D. Doedens, Midland, Mich., assignors to The Dow Chemical Company, Midland, Mich., a corporation of Delaware
No Drawing. Filed May 19, 1966, Ser. No. 551,216
Int. Cl. C08g *17/02*
U.S. Cl. 260—47
15 Claims

ABSTRACT OF THE DISCLOSURE

The present invention relates to novel compositions and methods in the polyester resin field. More particularly, this invention relates to polyesters of hydroxybenzoic acids fortified through the use of hydroxymethyl diphenyl oxide (hereinafter HMDPO) to produce thermoset resins having desired flexibility, toughness, chemical resistance, and stability at elevated temperatures. The resin compositions of this invention are particularly useful as insulating materials for electrical conductors.

BACKGROUND OF THE INVENTION

Polyesters consisting essentially of the hydroxybenzoic repeat unit are known in the art. As used herein, the term "hydroxybenzoic repeat unit" refers to recurring groups having the general formula:

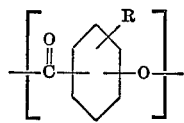

wherein R is hydrogen, fluorine, chlorine, or bromine or an alkyl or alkoxy group containing from 1 to 4 carbon atoms. When R is hydrogen, the recurring groups are properly called carbonylphenyleneoxy units. When R is one of the substituted groups, the recurring groups are called carbonyl (halo or alkyl or alkoxy of 1–4 carbon atoms) phenyleneoxy units.

Such polyesters may be prepared from the meta- and para-isomers of hydroxybenzoic acids according to the process of U.S. Patent 2,600,376, issued June 17, 1962. Methods for preparing polyesters of all isomers of hydroxybenzoic acids and consisting essentially of the hydroxybenzoic repeat unit are reviewed by Gilkey and Caldwell, Polyesters of Hydroxybenzoic Acids, Jour. App. Polymer Sci., 2, 198–202 (1959). Typically, they are prepared either by a self-condensation of a hydroxybenzoic acid or an acid interchange reaction involving an acetoxy derivative of benzoic acid, e.g., o-acetoxybenzoic, m-acetoxybenzoic, and p-acetoxybenzoic acids.

The electrical industry is constantly in search of new resin materials to be used as wire coatings, insulation varnishes, laminating resins, and the like, that can be used for constant operation at higher and higher temperatures. In particular the electrical industry is seeking insulating materials to perform in Class H service or higher. Such materials must, for example, be able to withstand constant temperatures of 180° C. or higher and temperatures greater than 200° C. for short intervals under overload conditions.

High temperature resistant resins in the above applications will allow for the construction of smaller and smaller electrical units such as motors, transformers, and the like, which will necessarily operate at higher temperatures. At the present time the only commercially available resins that will fulfill these requirements are the silicones and polyimides.

A wide variety of additions have been made to polyester resins prepared from hydroxybenzoic acids in order to change their fundamental properties. There still remains today, however, a need for further improvement in the properties of these resins, particularly for use in the areas indicated above.

SUMMARY OF THE INVENTION

It has now been discovered that improved polyester resins may be prepared by incorporating a hydroxymethyl diphenyl oxide as a fortifying agent into polyester resins consisting essentially of hydroxybenzoic repeat units. The HMDPO is added to the polyester in an amount of from about 5 to about 60 weight percent, HMDPO and polyester basis. The resulting composition, either as a mixture or as a prepolymer, is cured in the presence of a catalyst at elevated temperatures, i.e., from about 150° C. to about 500° C.

While the precise reactions of the present invention are not fully known, it is believed that alkylation and dehydration to produce cross linking through methylene bridging predominate in the case of self-polymerized hydroxybenzoic acid polyesters.

Polyesters consisting essentially of hydroxybenzoic repeat units and having molecular weights between about 1,000 and about 20,000 are operable for the practice of this invention. In the general formula for the hydroxybenzoic repeat unit:

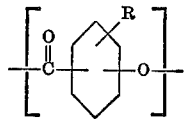

R is hydrogen, fluorine, chlorine, bromine, or an alkyl or alkoxy group containing from 1 to 4 carbon atoms, the R being attached in an ortho, meta, or para position with respect to the carbonyl group, which is not already occupied by the oxy group. Preferably, R represents the methyl, methoxy, ethyl, or ethoxy group or hydrogen. The carbonyl and oxy groups may be in an ortho, para, or meta position with respect to each other. Examples of hydroxybenzoic acids which can be employed in a self-condensation reaction to prepare polyesters which are modified in the present invention include m-hydroxybenzoic acid, p-hydroxybenzoic acid, o-hydroxybenzoic acid, the four isomers of methyl-m-hydroxybenzoic acid (3,2-cresotic acid, 3,4-cresotic acid, 3,5-cresotic acid, and 3,6-cresotic acid), the two isomers of methyl-p-hydroxybenzoic acid (4,2-cresotic acid and 4,3-cresotic acid), vanillic acid (4-hydroxy-3-methoxybenzoic acid), isovanillic acid (3-hydroxy-4-methoxybenzoic acid), and the like. For preparation of the polyesters by an acid interchange reaction, the corresponding acetoxy derivatives of the above hydroxybenzoic acids may be employed. The preferred polyesters for the practice of this invention are those wherein R in the repeat unit is hydrogen. These preferred polyesters may be prepared, for example, by the self-condensation of ortho-, meta-, or para-hydroxybenzoic acid or the acid interchange of ortho-, meta-, or para-acetoxybenzoic acid.

HMDPO suitable for the practice of this invention can be prepared by hydrolyzing with caustic a halomethylated diphenyl oxide in the manner disclosed in U.S. Patent 3,100,796, issued Aug. 13, 1963. Isomers of HMDPO which are operable with this invention when used either singly or as mixtures include: dimethylol diphenyl oxide, trimethylol diphenyl oxide, and tetramethylol diphenyl oxide. Preferable are para-, para'- dimethylol diphenyl oxide or a mixture of HMDPO's having the following range of mixed isomers:

| | Percent by weight |
|---|---|
| Monomethylol diphenyl oxide | 0–20 |
| Dimethylol diphenyl oxide | 64–76 |
| Trimethylol diphenyl oxide | 8–30 |
| Tetramethylol diphenyl oxide | 1–4 |

Catalysts suitable for this invention include either acidic or basic catalysts normally used for transesterification reactions. Examples of such catalysts include: zinc octoate, tetrabutyl titanate, zinc acetylacetonate, lead oxide, magnesium oxide, magnesium hydroxide, sodium ethylate, zinc stearate, antimony oxide, and p-toluenesulfonic acid. Preferably the catalyst should be completely soluble in the reaction mixture in order to insure a smooth, even coating after cure. The preferred catalysts for this invention are zinc octoate, tetrabutyl titanate, and zinc acetylacetonate.

In preparing the thermosettable compositions of the present invention, a polyester prepared from a hydroxybenzoic acid, the HMDPO, and the catalyst are mixed together by conventional means. The mixture is preferably dissolved in an inert solvent, i.e., a material in which the mixture is capable of forming at least a 5 percent by weight homogeneous solution and with which the mixture is non-reactive under the conditions of reaction used herein.

The mixture of HMDPO and polyester in the solvent may be applied directly to a surface to be coated and cured. Alternatively, the solution mixture may be heated, preferably for a time up to about 36 hours, at a temperature of from about 150° C. to about 300° C. to form a thermosettable prepolymer solution. The prepolymer solution is then applied to the surface to be coated and cured.

Suitable specific examples of inert solvents that may be used to prepare the thermosettable solutions of the present invention include the cyclic aliphatic ketones, such as cyclopentanone, cyclohexanone, and the like, and the glycol ethers, such as ethylene glycol methyl ether, ethylene glycol ethyl ether, ethylene glycol n-butyl ether, ethylene glycol phenyl ether, diethylene glycol methyl ether, diethylene glycol ethyl ether, diethylene glycol n-butyl ether, propylene glycol methyl ether, dipropylene glycol methyl ether, tripropylene glycol methyl ether; cresols, such as o-cresol, m-cresol, p-cresol; and alkylated toluenes; mixtures thereof; and the like. A mixture of solvents, such as cresylic acid (a mixture of phenols and cresols) or a mixture of a cyclic aliphatic ketone and a glycol ether, is preferred in order to give a spread in solvent boiling point while curing.

The resin solution, whether in the form of a simple physical mixture of HMDPO and polyester or as a prepolymer prepared as above, is used to make temperature and chemical resistant coatings by heating at the curing temperature until a sufficient amount of curing has taken place to produce the resin coating. Curing temperatures of from about 150° C. to about 500° C. are operable for the practice of this invention. Reaction temperatures less than about 150° C. result in unduly long curing times. The preferred curing temperature range is from about 200° C. to about 450° C. The curing time depends on the use made of the resin. For wire coating, a time of under thirty seconds will suffice. A coating of from 10 to 15 thousandths of an inch on an aluminum evaporating dish takes about fifteen minutes to cure.

From about 5 to about 60 weight percent, HMDPO and polyester basis, of the HMDPO is desired to produce the polyester resin of this invention. At least about 5 weight percent of the HMDPO is needed to give the desired thermal stability to the resin. Above about 60 weight percent of the HMDPO causes brittleness in the cured resin. Best results are obtained from about 20 to about 40 weight percent of HMDPO.

SPECIFIC EMBODIMENTS

The following examples describe completely representative specific embodiments of the invention claimed and the best modes contemplated by the inventors for practicing their claimed invention. The scope of the invention is limited only by the scope of the claims appended hereto.

Example 1

A polyester was prepared by the self-polymerization of m-hydroxybenzoic acid as follows: A quantity of 552 g. of m-hydroxybenzoic acid, 412 g. of acetic anhydride, and 0.5 g. of p-toluene sulfonic acid was placed in a reaction vessel equipped with refluxing means. The mixture was reacted at a temperature of about 200° C. with removal of acetic acid by distillation until no more acetic acid could be removed. The reaction mixture was further heated with stirring in a nitrogen atmosphere as follows:

| Time | Temperature, °C. | Pressure |
|---|---|---|
| 1½ hours | 205 | Atmospheric. |
| Do | 225 | Do. |
| 1 hour | 240 | Do. |
| Do | 260 | 15 mm./Hg vacuum. |
| Do | 260 | 1 mm./Hg vacuum. |
| 2 hours | 270 | Do. |

After the heating as above, the product was poured out hot. The polyester of m-hydroxybenzoic acid prepared by the above procedure had a molecular weight of 2,460 as determined by ebullioscopy.

A prepolymer formulation suitable for wire coating use was prepared from a charge consisting of 200 g. of the above polyester of m-hydroxybenzoic acid, 200 g. of a mixture of HMDPO identified as having from 0–20 percent by weight monomethylol diphenyl oxide, 64–75 percent by weight dimethylol diphenyl oxide, 8–30 percent by weight trimethylol diphenyl oxide, and 1–4 percent by weight tetramethylol diphenyl oxide, prepared by hydrolyzing chloromethylated diphenyl oxide with caustic; 300 g. of cyclohexanone; and 100 g. of ethylene glycol n-butyl ether. The above charge was heated with stirring until uniformly mixed and then filtered hot through a sintered glass filter. The mixture was then heated at 225° C. for 30 minutes to give a prepolymer product having 45.5 percent by weight solids.

A sufficient quantity of the above prepolymer was added to a two-inch diameter aluminum operating dish to give a 1 g. film on the dish. This corresponds to a coating of about 10 to 15 thousandths of an inch thickness. The evaporating dish was placed in an air circulating oven at 325° C. and cured for 10 minutes. A flexible thermoset film resulted which adhered to the aluminum dish. The aluminum dish could be bent in all directions without cracking or chipping the coating.

To measure the heat stability of these modified polyester coatings, an exposure test for 500 hours at 500° F. was conducted on an aluminum dish coated with the modified polyester as above. The weight loss of the sample was measured during this exposure test and is reported below in Table I.

TABLE I.—WEIGHT LOSS OF HYDROXYBENZOIC-HMDPO RESINS AFTER EXPOSURE TO 500° F. FOR 500 HOURS, WEIGHT LOSS (PERCENT)

Hours:
| | |
|---|---|
| 24 | 3.4 |
| 48 | 4.3 |
| 145 | 6.4 |
| 192 | 7.0 |
| 240 | 7.8 |
| 336 | 9.2 |
| 409 | 10.1 |
| 505 | 11.3 |

Substitution of other polyesters consisting essentially of hydroxybenzoic repeat units and having molecular weights between about 1,000 and about 20,000 for the meta-hydroxybenzoic acid polyesters used above gives similar HMDPO-modified thermosettable resinous compositions.

Example 2

A thermosettable HMDPO-modified polyester prepolymer prepared as in Example 1 was used to coat number 18 copper magnet wire continuously on a laboratory wire coating machine similar in design to commercially used magnet wire coaters. The coated wire was evaluated by the mandrel test and the General Electric abrasion scrape test.

In the mandrel test, the coated wire is stretched from about 5 to about 25 percent on a wire stretching machine. The wire is then wrapped around decreasing mandrel sizes starting at ten times the wire diameter. The elongation given is the maximum to pass the mandrel equal to the wire diameter without cracking or popping. The General Electric abrasion scrape test involves passing a 0.016 inch diameter needle under a 700 g. load on a piece of coated wire through which an electrical current is passed. The needle is allowed to scrape on the coating until it breaks through, shorting out the wire. The value is essentially equal to the number of passes the needle makes. The results reported are the average of 5 runs.

The prepolymer was run on the wire coating machine with the curing tower at 450° C. at a speed of 15 feet per minute for 6 coatings. The final coated wire diameter was 0.0438 inch. The wire passed a mandrel equal to the wire diameter at between 5 to 10 percent elongation and had a General Electric abrasion scrape value of 53.

The above examples show that, when fortified with HMDPO, polyesters consisting essentially of repeating hydroxybenzoic repeat units may be used to prepare coatings having a sizeable degree of thermal stability improvement while having flexibility and toughness comparable to coatings prepared from commercially-available polyesters.

What is claimed is:

1. A thermosettable resinous hydroxymethyl diphenyl oxide-modified polyester composition comprising:
   (a) about 5 to about 60 percent by weight, based on the combined weights of (a) and (b), of a hydroxymethyl diphenyl oxide which is at least one of mono-, di-, tri- or tetra-(hydroxymethyl)diphenyl oxide, and the mono-substituted isomer is present in an amount not greater than about 20 percent by weight of the total hydroxymethyl diphenyl oxide, and
   (b) about 40 to about 95 percent by weight, based on the combined weights of (a) and (b), of a resinous polyester having a molecular weight between about 1,000 and about 20,000 and consisting essentially of hydroxybenzoic repeat units having the general formula

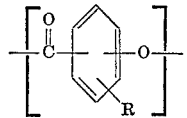

wherein R is hydrogen, fluorine, chlorine, bromine or an alkyl or alkoxy group of 1–4 carbon atoms.

2. The process of curing the polyester composition of claim 1 comprising heating the composition at a temperature between about 150° C. and about 500° C. in the presence of a transesterification catalyst.

3. The product produced by the process of claim 2.

4. An insulated electrical conductor comprising an electrical conductor coated with the polyester composition defined in claim 1.

5. The insulated electrical conductor defined in claim 4, the coating of which has been cured by heating at a temperature between about 150° C. and about 500° C. in the presence of a catalyst.

6. The insulated electrical conductor defined in claim 5 wherein the hydroxymethyl diphenyl oxide component is present in an amount of about 20 to about 40 percent by weight, the catalyst is zinc octoate, tetra-butyl titanate or zinc acetylacetonate and the cure temperature is between about 200° C. and about 450° C.

7. The polyester composition defined in claim 15 wherein the hydroxymethyl diphenyl oxide is essentially di-(hydroxymethyl)diphenyl oxide.

8. The polyester composition defined in claim 7 wherein the hydroxymethyl diphenyl oxide is p,p'-, di-(hydroxymethyl)diphenyl oxide.

9. The polyester composition defined in claim 1 wherein R is hydrogen, methyl, ethyl, methoxy or ethoxy.

10. The polyester composition defined in claim 9 wherein R is hydrogen.

11. A thermosettable resinous composition as in claim 1 wherein said polyester consists essentially of m-hydroxybenzoic repeat units.

12. A thermosettable resinous composition as in claim 1 wherein said hydroxymethyl diphenyl oxide is a mixture containing from about 9 to about 35 percent by weight of hydroxymethyl diphenyl oxide having at least three methylol groups per molecule.

13. A thermosettable resinous composition as in claim 1 wherein said polyester consists essentially of m-hydroxybenzoic repeat units, said hydroxymethyl diphenyl oxide is a mixture containing from about 9 to about 35 percent by weight of hydroxymethyl diphenyl oxide having at least three methylol groups per molecule, and the mixture of said hydroxymethyl diphenyl oxide is present in an amount of from about 20 to about 40 percent by weight.

14. The process of claim 2 wherein said polyester consists essentially of o-hydroxybenzoic, p-hydroxybenzoic, or m-hydroxybenzoic repeat units, said hydroxymethyl diphenyl oxide is present in an amount of from about 20 to about 40 weight percent, said catalyst is selected from the group consisting of zinc octoate, tetrabutyl titanate, and zinc acetylacetonate, and said polyester is cured at a temperature of from about 200° to about 450° C.

15. A cured polymeric ester resin prepared in accordance with the process of claim 14.

References Cited

UNITED STATES PATENTS

| | | |
|---|---|---|
| 2,600,376 | 6/1952 | Caldwell. |
| 3,100,796 | 8/1963 | Trapp et al. |
| 3,177,180 | 4/1965 | Doedens et al. |
| 3,269,973 | 8/1966 | Doedens et al. _____ 260—47 |

FOREIGN PATENTS

| | | |
|---|---|---|
| 835,823 | 5/1960 | Great Britain. |
| 984,884 | 3/1965 | Great Britain. |

WILLIAM H. SHORT, *Primary Examiner.*

L. P. QUAST, *Assistant Examiner.*

U.S. Cl. X.R.

117—128.4, 132; 260—32.8, 33.2, 33.4, 33.6

PO-1050
(5/69)

UNITED STATES PATENT OFFICE
CERTIFICATE OF CORRECTION

Patent No. 3,444,131            Dated May 13, 1969

Inventor(s) Earl H. Rosenbrock and James D. Doedens

It is certified that error appears in the above-identified patent and that said Letters Patent are hereby corrected as shown below:

Column 6, line 13, for the reference numeral "15" read -- 1 --.

SIGNED AND
SEALED

SEP 30 1969

(SEAL)
Attest:

Edward M. Fletcher, Jr.
Attesting Officer

WILLIAM E. SCHUYLER, JR
Commissioner of Patents